F. CONZI.
GUIDING AND TRACING APPARATUS FOR VEHICLES.
APPLICATION FILED JUNE 29, 1920.

1,436,237.

Patented Nov. 21, 1922.
4 SHEETS—SHEET 1.

Inventor
F. Conzi
By H. R. Kerslake
Atty.

F. CONZI.
GUIDING AND TRACING APPARATUS FOR VEHICLES.
APPLICATION FILED JUNE 29, 1920.

1,436,237.

Patented Nov. 21, 1922.
4 SHEETS—SHEET 2.

Inventor
F. Conzi.
By H. R. Kerslake
Atty.

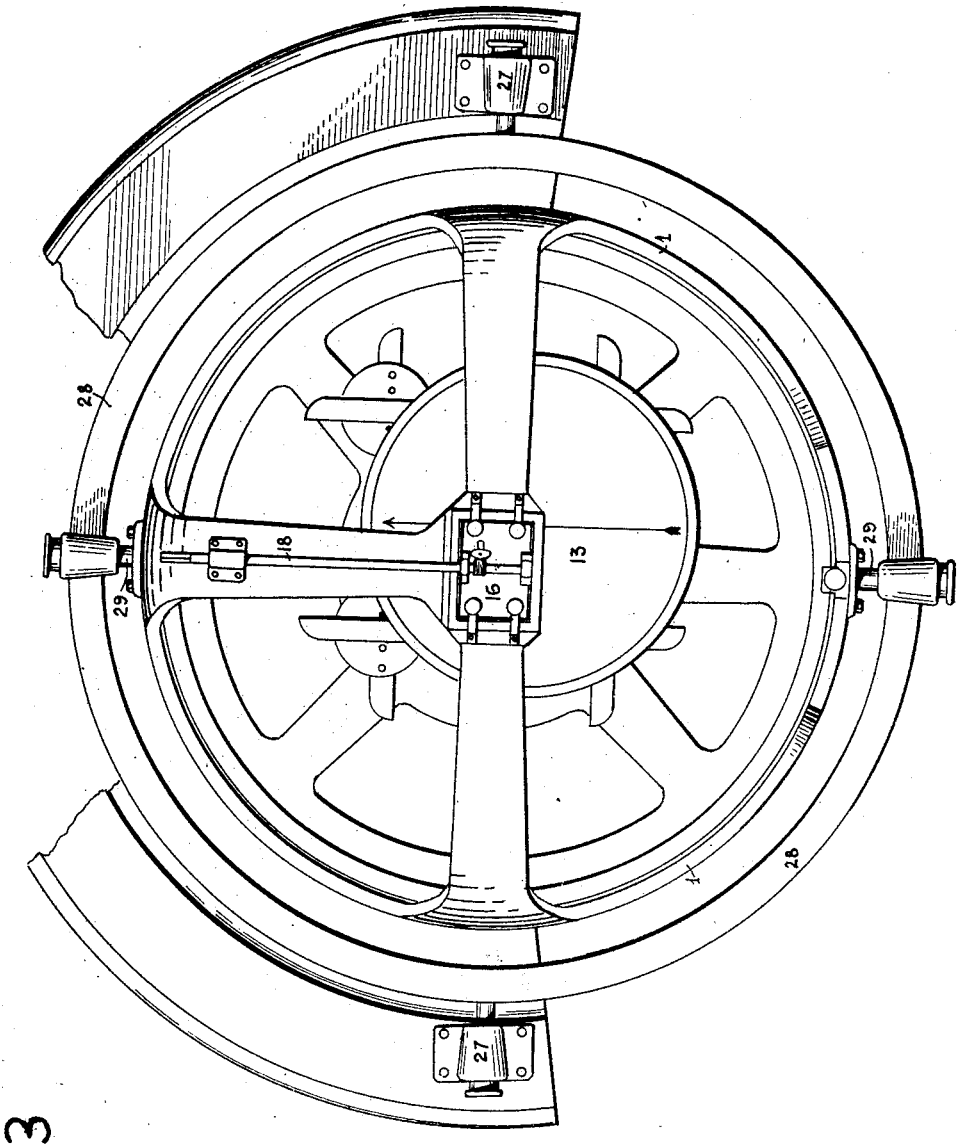

F. CONZI.
GUIDING AND TRACING APPARATUS FOR VEHICLES.
APPLICATION FILED JUNE 29, 1920.
1,436,237.
Patented Nov. 21, 1922.
4 SHEETS—SHEET 4.
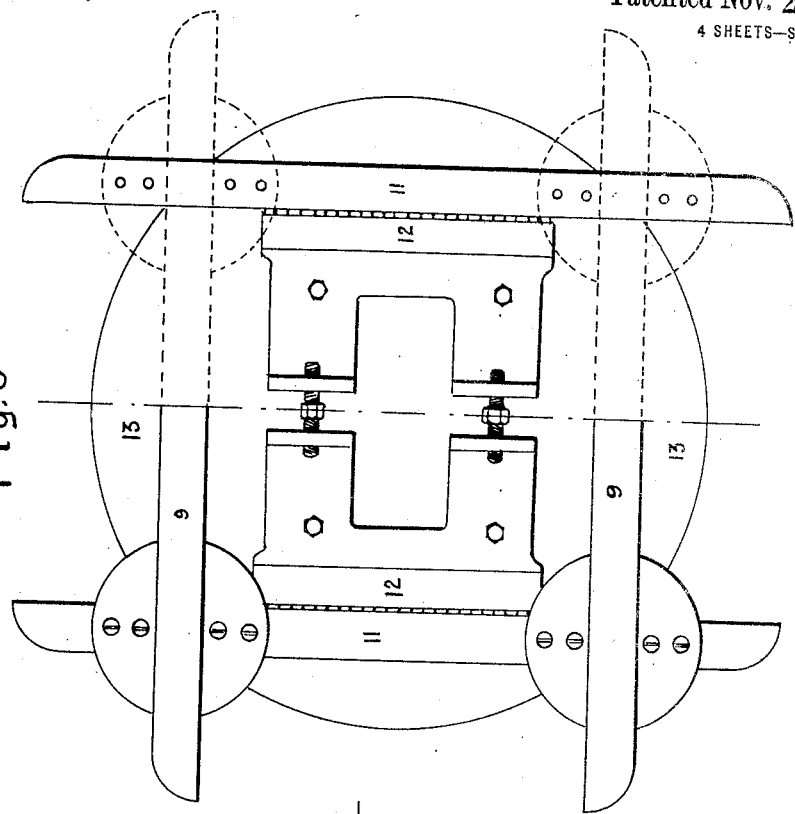
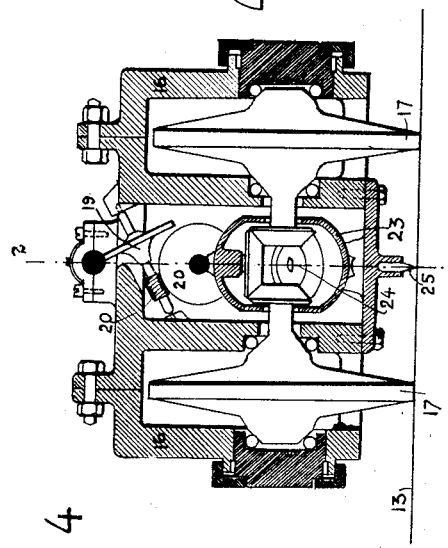
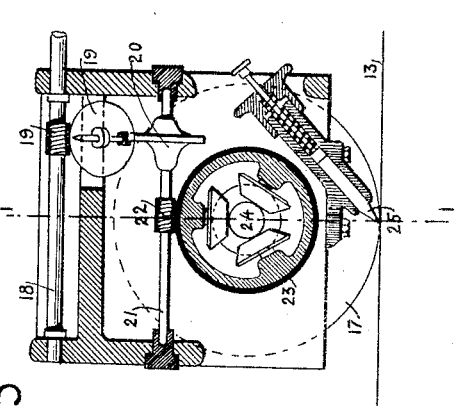
Inventor
F. Conzi.
By H. R. Kerslake
Atty.

Patented Nov. 21, 1922.

1,436,237

UNITED STATES PATENT OFFICE.

FRANCESCO CONZI, OF GENOA, ITALY.

GUIDING AND TRACING APPARATUS FOR VEHICLES.

Application filed June 29, 1920. Serial No. 392,903.

(GRANTED UNDER THE PROVISIONS OF THE ACT OF MARCH 3, 1921, 41 STAT. L., 1313.)

*To all whom it may concern:*

Be it known that I, FRANCESCO CONZI, a subject of the King of Italy, residing at Salita S. Anna 15, Genoa, Italy, have invented a new and useful Device for Guiding and Tracing Apparatus for Vehicles (for which I have filed applications in Italy May 4 and June 10, 1916, Patent No. 154,006, Dec. 22, 1916), of which the following is a specification.

The invention relates to improvements in devices for guiding vehicles according to a preestablished course or for tracing the course covered by a vehicle without any outside points of reference.

According to the present invention, within a casing, suspended by a Cardan joint on the craft, is arranged a gyroscope supported by two jointed frames, of which the outer one is connected with a plate bearing a navigation chart that is arranged perpendicularly to the axis of this frame and in such a manner that this plate can be displaced in two directions at right angles to one another, owing to the rotation of a pair of rollers in frictional contact with the chart plate. These rollers are rotatably arranged on a slide rigidly fastened to the casing of the device and coupled by a differential gear driven at a speed proportionally reduced to that of the craft.

The slide is provided with a pointer or with a lead pencil which follows the course of a navigation chart placed on the plate beneath the same, and this allows the craft to follow the course mapped of the chart. On the other hand, the course covered by a craft may, by the same means, be traced on a chart.

The invention is illustrated in the accompanying drawing:

Fig. 3 is a top view of the same;

Fig. 4 is a sectional view of the slide taken on line 1—1 of Fig. 5, and Fig. 5 is a sectional view of the same taken on line 2—2 of Fig. 4.

Fig. 6 is a bottom plan view of the plate which carries the navigation chart.

In these figures the same numbers indicate the same parts.

Figure 1:
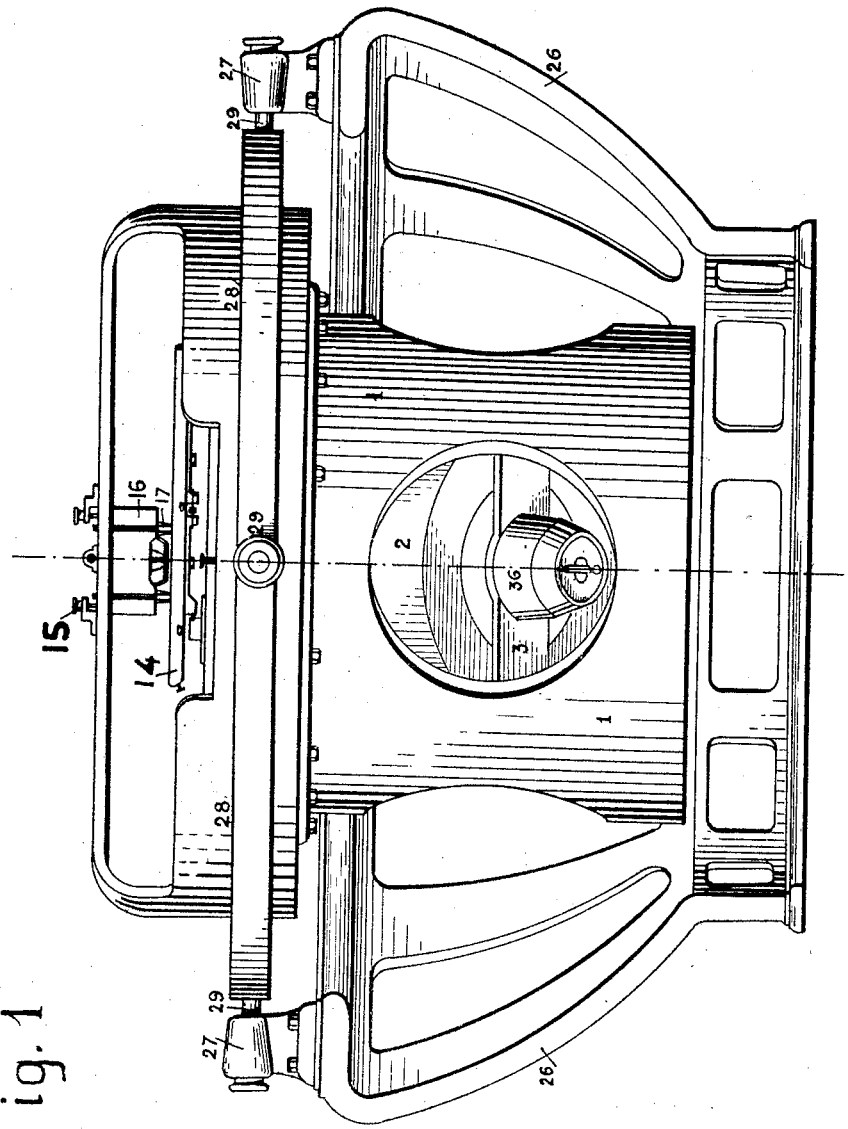
Fig. 1 is a front view of the complete device.

The movable casing 1 of the device is mounted for swinging movement in the manner hereinafter described, on a frame 26 which is fixed to the vehicle. The casing encloses in its lower cylindrical part, a gyroscope 2 supported by two jointed frames 3 and 4. The inner one 3 is pivotally connected by means of its two horizontal trunnions to the outer frame 4, which is provided with two vertical pins 5 and 6. The lower one 5 rests upon the bottom of the casing 1 and the upper one 6 extends through the wall 7 of the casing 1 and is connected with the disk 8.

On the disk 8 are arranged two superposed pairs of guides 9 and 10 of which the first pair 9, constituted of parallel rules, can slide by the medium of antifriction balls on the adjustable guides 10 fastened upon the disk 8. Arranged at right angles to and fastened to the rules 9 are two parallel rules 11, which can slide by the medium of antifriction balls upon the adjustable guides 12, fastened to the underside of the circular plate 13. The navigation chart or paper on which the course of the craft is to be registered is mounted on the plate 13, and is secured in place by means of an annular ring 14 which is put on the plate from above and is fastened to the plate by means of threaded studs.

Figure 2:
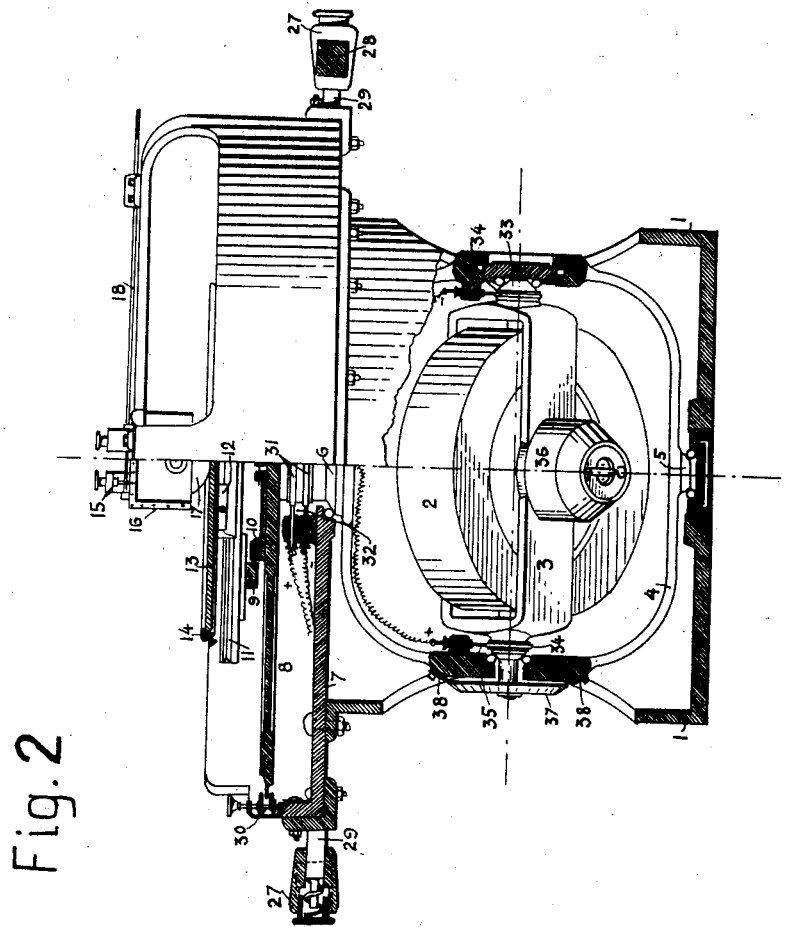
Fig. 2 is a partial central vertical sectional view and partially a side view.

Rigidly fastened on the upper part of the movable casing 1 is a slide provided with a pointer or a pencil. This slide substantially consists as best shown in Figs. 4 and 5 of a rectangular box 16 carrying the two rollers 17, which are mounted in ball bearings. By means of studs 15, shown in Figs. 1 and 2 this slide is kept in frictional contact through the rollers 17 with the plate 13 whereby the frictional contact between the rollers and the plate can be regulated at pleasure. A shaft 18 driven at a speed proportionally reduced to that of the speed of the craft, drives by means of the worms and corresponding worm wheels 19 and 20, the intermediate shaft 21, from which, by means of the worm 22, the movement is transmitted to the toothed periphery of the casing of the differential gear 23, of known construction, that is arranged between the two rollers 17. These rollers have rough peripheries in order to hinder the sliding of the plate 13.

In the lower part of the slide is fastened adjustably the pointer or tracing pencil 25, the end of which bears against the chart on the plate 13 and is situated on the vertical central axis of the device.

The upper part of the casing 1 is enlarged, and this enlargement, through the medium of a Cardan joint, is suspended on the frame or pedestal 26 that is rigidly fastened on the craft on which the device is applied. The Cardan joint has two diametrically opposite bearings 27 arranged on the pedestal 26 and serving as supports for the trunnions of an annular piece 28, which is provided with two diametrically opposite bearings that support the trunnions 29 fastened on the casing 1.

The disk 8 has its periphery projecting within a clamp 30 arranged on the casing 1 (see Fig. 2), which clamp includes a threaded pin having left and right hand threads, which cause the jaws of the clamp to engage the disk when the device is out of service.

The trunnion 6 of the gyroscope is journaled in a ball bearing as are all the trunnions of the two gyroscope frames. The trunnion 6 is provided with two collector rings 31 on which bear the electric current conducting brushes 32. The trunnions 33 of the inner frame 3 of the gyroscope are respectively provided with a collector ring 34 on which bear the brushes 35. The electric current passes, therefore, from the brushes 32 to the brushes 35 and feeds the motor 36 arranged on the frame 3, which motor drives the gyroscope. At the end of one of the trunnions 33 is fastened a graduated dial 37 which cooperates with two pointers 38 fastened on the frame 4, to permit the establishment of the position or inclination of the axis of the gyroscope 2 and to indicate when this axis has been brought into a position parallel to an axis of the earth.

After the device has been applied for instance to a submarine boat and suspended on it by means of the Cardan joint, the axis of the gyroscope is brought into a parallel position with respect to the axis of the earth. Then the electric motor is put in motion and this consequently puts in motion the gyroscope 2. The gyroscope tends to maintain its axis constantly in a position parallel to the initial one, and due to this the plate 13 will also conserve its orientation according to the original one. The rollers 17 of the slide displace the plate 13 and the navigation chart with a speed proportionally reduced to that of the craft. As long as the movement of the craft is rectilinear, the pointer 25 or tracing pencil will follow or trace a rectilinear course on the navigation chart, the length of which corresponds with the course covered by the craft. If deviation of the craft takes place from the rectilinear course the plate 13 and the navigation chart will conserve its original orientation on account of the rotation of the gyroscope, whilst the craft and frame 26 will turn around the plate 13, which turning movement is also accomplished by the slide, as its rollers 17 are hinged to the differential gear 24, and the rotation of the slide causes again a rectilinear displacement of the plate 13. In this condition the pointer or tracing pencil 25 will follow or trace a broken or curved line on the navigation chart according to the way described by the craft.

The device according to the present invention also serves to indicate on a chart fastened on the plate 13, the course covered by a craft, as well as to follow a preestablished course given by a topographical chart in a determined scale fastened on plate 13.

The ratio between the number of revolutions of the shaft 18 of the slide and of the speed of the craft can be determined in any convenient manner. If the device is to be applied to a road vehicle, a direct connection will be made between a wheel of the vehicle and the shaft of the slide. If the device is to be applied on a water or air craft, a direct connection between the motor shaft of the craft and the shaft 18 of the slide will be established. The craft can also be provided with the usual water or air screw, which balanced by a counter weight, will put in motion the shaft 18 of the slide in correspondence with the speed of the craft.

The device is adapted to permit the employment of navigation charts now in use, and may be used in tracing navigation courses in the most different scales. For this purpose the device will simply be supplied with a speed transmission box containing sets of reducing gears, which permit changing in a convenient manner of the ratio between the number of revolutions of the shaft 18 of the slide and the speed of the craft.

I claim:

1. An improved apparatus for guiding a craft according to a predetermined course on a topographical chart or for tracing its course without any outside points of reference, including a casing suspended by a Cardan joint on a craft, a gyroscope arranged within the casing and supported by inner and outer joint frames situated normally to each other, a plate connected to the outer one of said frames, a navigation chart carried by said plate, said plate being displaceable in a plane normal to the axis of the frame in two directions at right angles to one another, a slide rigidly fastened on the casing, a pointer or tracing pencil connected to said slide, two rollers connected to the slide and frictionally engaging said chart, a differential gear coupling said rollers, and means for driving said gear at a speed proportionate to that of the craft.

2. An apparatus for guiding a craft according to a predetermined course on a topographical chart or for tracing its course without any outside points of reference, including a supporting member adapted to be fixedly mounted on a craft, a ring pivotally mounted on said supporting member, a casing pivotally mounted within said ring, the pivotal axis of said casing being arranged at right angles to the pivotal axis of said ring, a frame arranged within said casing and movable about a vertical axis, another frame mounted in the casing and movable about a horizontal axis, a gyroscope carried by one of said frames, a vertical post carried by the other one of said frames, a disk supported by said post, a plate arranged above said disk and adapted to support a navigation chart, means arranged between said plate and said disk to permit said plate to move universally relatively to said disk, and means carried by the casing and provided with a pointer adapted to cooperate with said chart.

3. An apparatus as claimed in claim 2 in which the last mentioned means includes a box, a plurality of rollers mounted in the box, a differential gearing coupling said rollers, and means for driving said differential gearing at a speed reduced relatively to the speed of the craft.

In testimony whereof I have signed my name to this specification in the presence of two subscribing witnesses.

ING. FRANCESCO CONZI.

Witnesses:
 ADOLFO WEBER,
 WILLIAM P. SHOCKLEY.